(12) United States Patent
Brzozowski et al.

(10) Patent No.: US 9,813,527 B2
(45) Date of Patent: *Nov. 7, 2017

(54) MANAGEMENT OF NETWORK CONFIGURATION AND ADDRESS PROVISIONING

(71) Applicant: Comcast Cable Communications, LLC, Philadelphia, PA (US)

(72) Inventors: John Jason Brzozowski, Schwenksville, PA (US); Jason Combs, Cherry Hill, NJ (US); Christopher Tuska, Parker, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/146,435

(22) Filed: May 4, 2016

(65) Prior Publication Data

US 2016/0323423 A1 Nov. 3, 2016

Related U.S. Application Data

(63) Continuation of application No. 13/827,500, filed on Mar. 14, 2013, now Pat. No. 9,363,340.

(51) Int. Cl.
*H04L 29/06* (2006.01)
*H04L 12/24* (2006.01)
*H04L 29/12* (2006.01)

(52) U.S. Cl.
CPC .......... *H04L 69/18* (2013.01); *H04L 41/0806* (2013.01); *H04L 61/2007* (2013.01); *H04L 61/6086* (2013.01); *H04L 69/167* (2013.01)

(58) Field of Classification Search
CPC ... H04L 69/18; H04L 69/167; H04L 61/6086; H04L 61/2007
See application file for complete search history.

(56) References Cited

U.S. PATENT DOCUMENTS 9,363,340 B2 * 6/2016 Brzozowski .......... H04L 69/167
2006/0092134 A1 * 5/2006 Ohara .................... H04L 69/18 345/161
2010/0309813 A1 * 12/2010 Singh .................. H04L 12/2801 370/254

(Continued)

*Primary Examiner* — John B Walsh
(74) *Attorney, Agent, or Firm* — Ballard Spahr LLP

(57) ABSTRACT

Provided are systems and methods for network management and configuration, Exemplary methods can comprise communicating a first message to a network device. The first message can specify one of a first protocol or a second protocol. Methods can comprise configuring a first logical address for the network device based at least on the first message. Methods can comprise communicating a second message to the network device. The second message can specify one of a first mode, directing the network device to use the first protocol to connect to a network, or a second mode, directing the network device to use the second protocol to connect to the network. Methods can also comprise receiving a notification to release the first logical address from the network device. Methods can further comprise configuring a second logical address for the network device that can be defined according to the second message.

20 Claims, 13 Drawing Sheets

(56) References Cited

U.S. PATENT DOCUMENTS

2013/0078985 A1* 3/2013 Savolainen ....... H04L 29/12952
  455/418
2013/0103805 A1* 4/2013 Lyon .................. H04L 67/2814
  709/219

* cited by examiner

MANAGEMENT OF NETWORK CONFIGURATION AND ADDRESS PROVISIONING

CROSS REFERENCE TO RELATED APPLICATION

This application is a Continuation of U.S. Non-Provisional application Ser. No. 13/827,500 filed Mar. 14, 2013, herein incorporated by reference in its entirety.

BACKGROUND

Network address provisioning systems using a 32 bit internet address system can provide network addresses for about 4.3 billion unique addresses on one network. The number of individuals in the world, however, is estimated at roughly 7 billion. The Internet is a global network used by individuals all over the world. As more people connect to the Internet or other large networks with more and more devices, new address provisioning systems using addresses greater than 32 bits need to be utilized to handle the increased number of network devices connecting to the Internet. As new address provisioning systems become available, difficulties can arise in transitioning a network from one address provisioning system to another or in integrating one address provisioning system with another address provisioning system, Thus, there is a need for more sophisticated methods and systems for network configuration.

SUMMARY

It is to be understood that both the following general description and the following detailed description are exemplary and explanatory only and are not restrictive, as claimed. Provided are methods and systems for network management and configuration. In one aspect, methods can comprise communicating a first message to a network device. The first message (e.g., directive, communication) can specify one of a first protocol or a second protocol. A first logical address can be configured for the network device based at least on the first message. A second message can be communicated to the network device. The second message can specify one of a first mode, directing the network device to use the first protocol to connect to a network, or a second mode, directing the network device to use the second protocol to connect to the network. A notification to release the first logical address can be received from the network device. A second logical address can be configured for the network device. The second logical address can be defined according to the second message.

In another aspect, methods can comprise communicating a first message to a plurality of network devices. The first message can specify one of a first protocol or a second protocol. A first logical address can be configured for each of the plurality of network devices based on the first message. A second message can be communicated to at least a portion of the plurality of network devices. The second message can specify one of a first mode, directing each network device of the portion of the plurality of network devices to use the first protocol to connect to a network, or a second mode, directing each network device of the portion of the plurality of network devices to use the second protocol to connect to the network. Each first logical address can be released from each network device of the portion of the plurality of network devices. Additionally, a second logical address can be configured for each network device of the portion of the plurality of network devices. Each second logical address can be defined according to the second message.

In yet another aspect, methods can comprise communicating a message (e.g., directive, communication) to a network device. The message can specify one of a first mode directing the network device to use a first protocol to connect to a network or a second mode directing the network device to use a second protocol to connect to the network. A first logical address assigned to the network device can be released. A second logical address can be configured for the network device. The second logical address can be defined according to the message.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
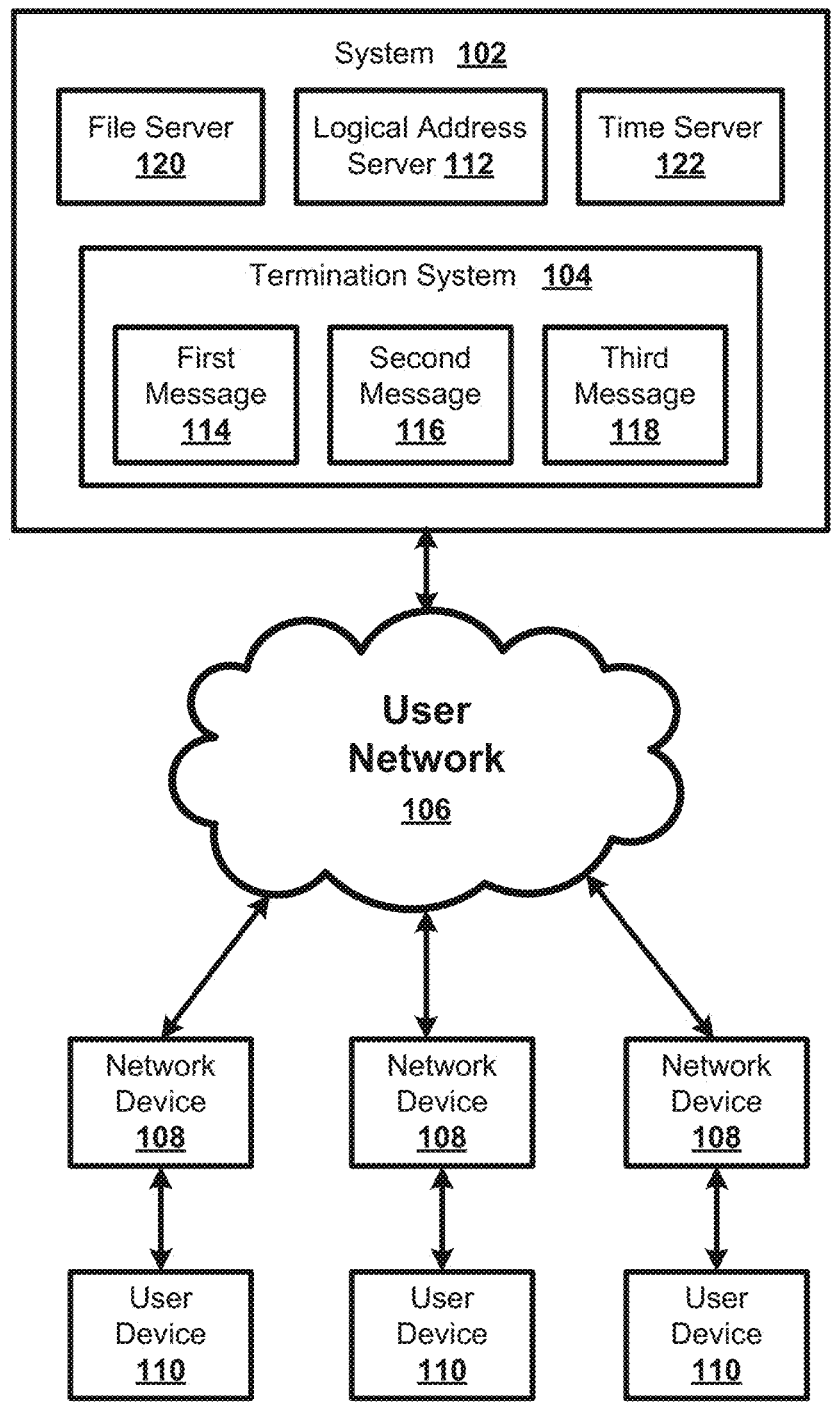
FIG. 1 is a block diagram illustrating an exemplary system for network configuration.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," and "the" include plural referents unless the context clearly dictates otherwise, Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps, "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for network configuration. The methods and system relate to provisioning one or more network devices using different provisioning systems. Those skilled in the art will appreciate that the present methods may be used in systems that employ both digital and analog equipment. One skilled in the art will appreciate that provided herein is a functional description and that the respective functions can be performed by software, hardware, or a combination of software and hardware.

FIG. 1 is a block diagram illustrating various aspects of an exemplary system 102 in which the present methods and systems can operate. The system 102 can comprise a termination system 104 configured to provide a network interface between one or more networks. For example, the termination system 104 can provide an interface between a user network 106 (e.g., subscriber network) and another network, such as the Internet. The termination system 104 can be located at a central location of an internet service provider, such as a network hub or a headend. The user network 106 can comprise a plurality of subscriber lines connected to the termination system 104 through one or more network nodes. The user network 106 can connect the termination system 104 to one or more network devices 108, and each network device 108 can be located at a residence or business of a subscriber.

In one aspect, the termination system 104 can comprise a cable modem termination system, and one or more of the network devices 108 can comprise a cable modem. In another aspect, the termination system 104 can comprise a digital subscriber line access multiplexer (DSLAM), and the network device 108 can comprise a digital subscriber line (DST) modem. The user network 106 can be configured as a cable connection (e.g., DOCSIS based connection), telephone connection, ISDN connection, DSL connection, satellite link, wireless connection, cellular connection or other network connection. The user network 106 can comprise fiber optic cable, coaxial cable, wireless link, satellite link, and the like. Additionally, the network device 108 can comprise a modem, satellite receiver, wireless receiver, and the like. In one aspect, the network device 108 can be connected to one or more user devices 110. For example, a user device 110 can comprise a wireless router, personal computer, tablet computer, handheld computing device, television, or other device connected to the network device 108 by the subscriber.

In an aspect, the system 102 can comprise one or more logical address servers 112. The logical address server 112 can be configured to provide a logical address to a network device 108. The logical address can be an identifier for a network device 108 such that the network device can be located on the user network 106. For example, a logical address can comprise an Internet Protocol (IP) address. The logical address can be an IP address formatted according to Internet Protocol version 4 (IPv4). For example, the IP address can comprise 32 bits, and the IP address can be represented in dotted-decimal notation as four groups of decimal numbers separated by decimal points, as shown in the following non-limiting example: 10.252.100.209. In another aspect, the logical address can be an IP address formatted according to Internet Protocol version 6 (IPv6). For example, the IP address can comprise 128 bits, and the IP address can be represented as eight groups of hexadecimal numbers, each group separated by colons, as shown in the following non-limiting example: 2001:0db8:4070:0001:0215:a2ff:fe43:7b65. In some representations of an IPv6 based logical address, the leading zeros can be omitted. Additionally, the logical address can be formatted according to other versions of Internet Protocol or a similar protocol utilizing network addresses.

In an aspect, the termination system 104 can comprise one or more messages e.g., directives, communications) 114, 116, and 118. For example, the termination system 104 can comprise a first message 114 and a second message 116. In one aspect, each message comprises an instruction specifying a mode of connection. For example, each message can specify a protocol to use for establishing a connection. The first message 114 can specify one of a first protocol or a second protocol. The first message 114 and/or second message 116 can specify either a first mode or second mode. The first mode can direct the network device 108 to use the first protocol to connect to a network. For example, the first protocol can comprise IPv4. The second mode can direct the network device 108 to use the second protocol to connect to the network. For example, the second protocol can comprise IPv6. Those of ordinary skill in the art will appreciate that in other aspects, different protocol arrangements can be appropriate. For example, the first protocol can be IPv6 and the second protocol can be IPv4. Additionally, the first protocol and/or second protocol can comprise other protocols for communicating across a network, such as internet control message protocol version 4, internet control protocol version 6, and the like. In another aspect, the second message can specify one of the first mode, the second mode, or a third mode. The third mode can direct the network device 108 to use one of the first protocol or the second protocol specified by the first message to connect to the network. Additionally, the termination system 104 can comprise one or more additional messages, such as a third message 118. In one aspect, the first protocol and/or second protocol can be a version of Internet Protocol other than version 4 or version 6. Alternatively, the first protocol and/or second protocol can comprise a different protocol utilizing network addresses.

In an aspect, the first message 114 can comprise an access layer control message. For example, the access layer control message can comprise a medium access control (MAC) domain descriptor. The access layer control message can be abase layer delivery mechanism of modem registration information that is available to the network 108 device after initial ranging. The access layer control message can contain IP initialization information. The access layer control message can be communicated by the termination system 104 to a network device 108. For example, the termination system 104 can periodically broadcast the access layer control message across the user network 106. As a network device 108 begins the initialization process, for example the process described in FIG. 4, the network device 108 can listen on one or more physical channels of the user network 106 for the access layer control message. In one aspect, the access layer control message can indicate an IP provisioning mode or connection mode, such as the first mode, second mode, or third mode described above.

In an aspect, the second message 116 can comprise a protocol configuration override message. For example, the protocol configuration override message can comprise a MAC domain descriptor Internet Protocol provisioning mode override message. As a further example, the second message 116 can comprise an IP provisioning mode attribute within a MAC domain descriptor message. The second message 116 can communicate an instruction to dismiss the first message 114. An instruction to dismiss the first message 114 can be communicated by the transfer of information or by the absence of a transfer of information.

In an aspect, the system 102 can comprise a file server 120 configured to transfer files to the network devices 108. For example, the file server 120 can be a trivial file transfer protocol server configured to communicate files to the network devices 108 using trivial file transfer protocol. Accordingly, the network device 108 can receive a file (e.g., a boot file) with configuration information such as the second message 116 from the file server 120. In another aspect, the system 102 can comprise a time server 122 configured to provide timing information to each of the network devices 108. For example, the network device 108 can receive time of day information from the time server 122, The system 102 can also comprise other servers managers, agents, and devices for managing a network, such as, for example, a simple network management protocol (SNMP) manager configured to send and receive SNMP messages or a hypertext transfer protocol (HTTP) server configured to send and receive HTTP messages.

Figure 2A:
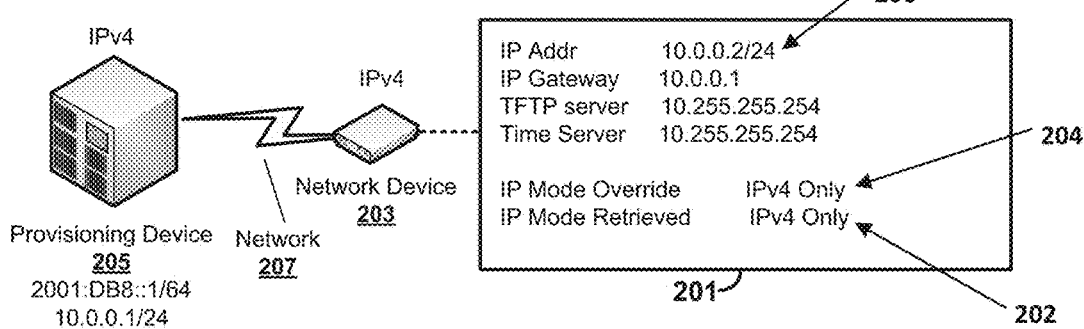
FIG. 2A shows a configuration interface of an exemplary network device.
Figure 2B:
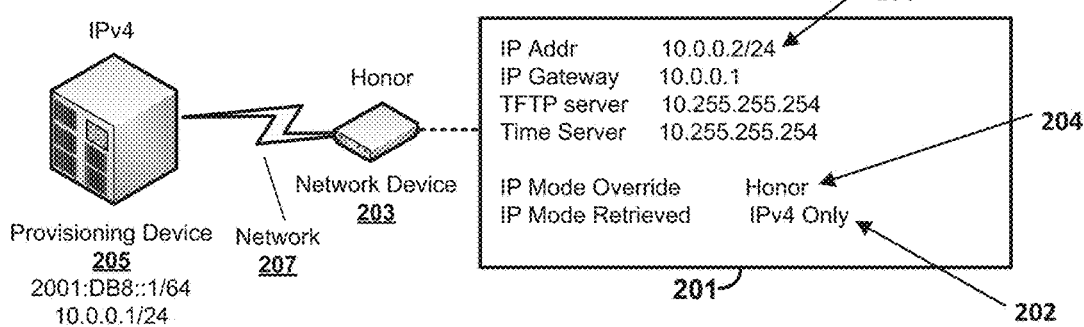
FIG. 2B shows another configuration interface of an exemplary network device.
Figure 2C:
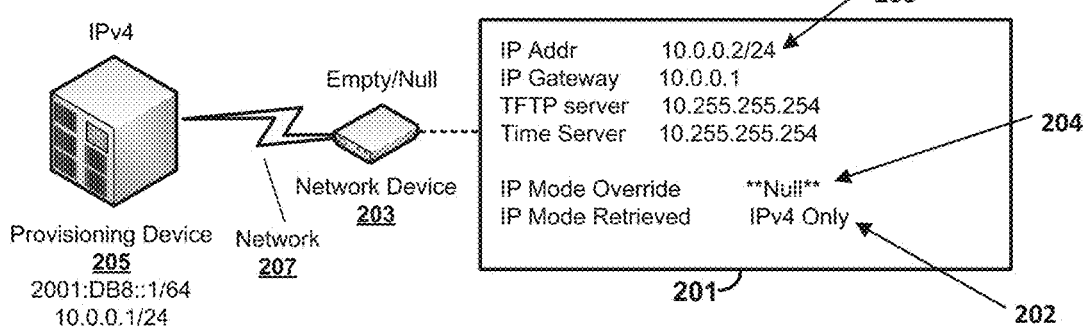
FIG. 2C shows another configuration interface of an exemplary network device.
Figure 2D:
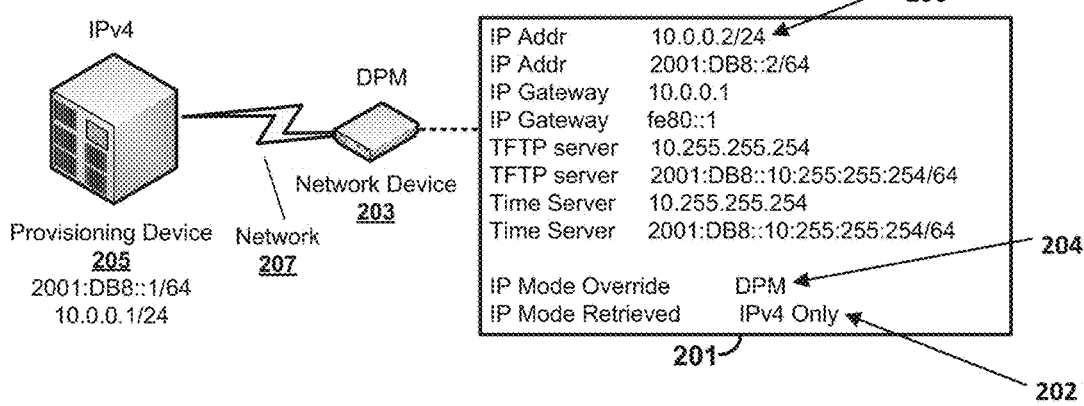
FIG. 2D shows another configuration interface of an exemplary network device.
Figure 2E:
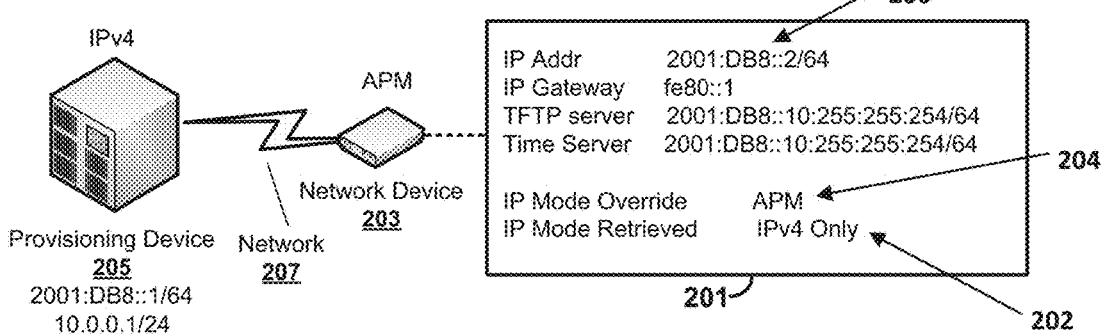
FIG. 2E shows another configuration interface of an exemplary network device.
Figure 2F:
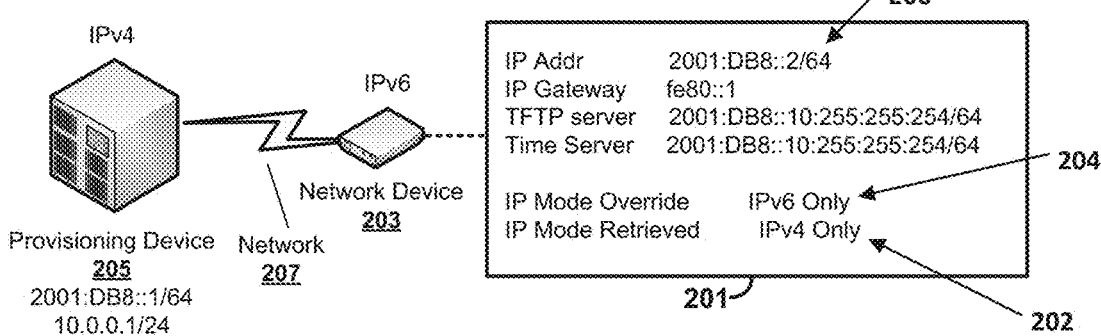
FIG. 2F shows another configuration interface of an exemplary network device.
Figure 2G:
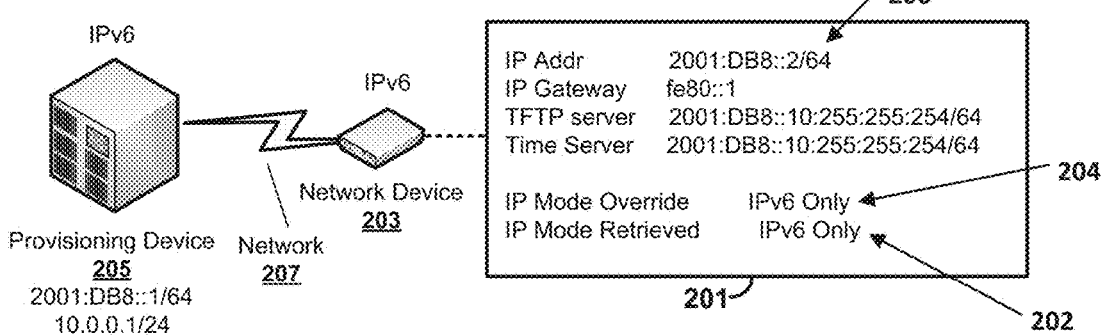
FIG. 2G shows another configuration interface of an exemplary network device.
Figure 2H:
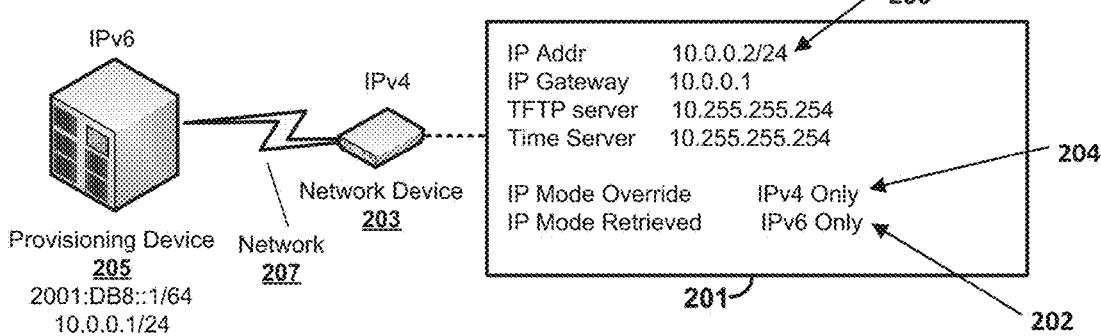
FIG. 2H shows another configuration interface of an exemplary network device.
Figure 2I:
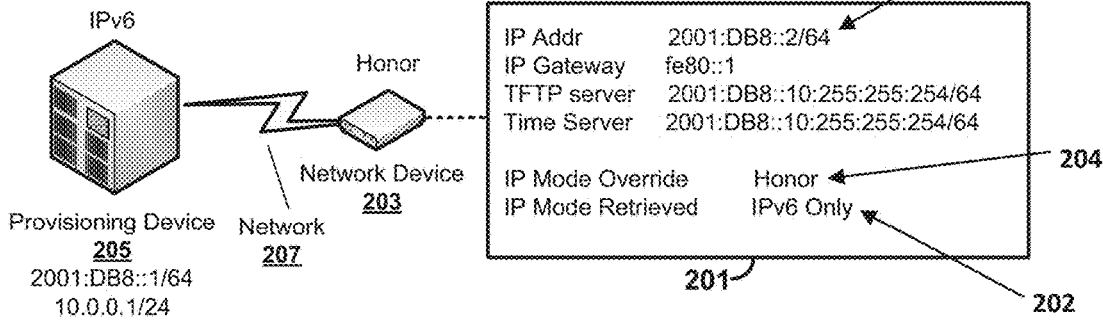
FIG. 2I shows another configuration interface of an exemplary network device.
Figure 2J:
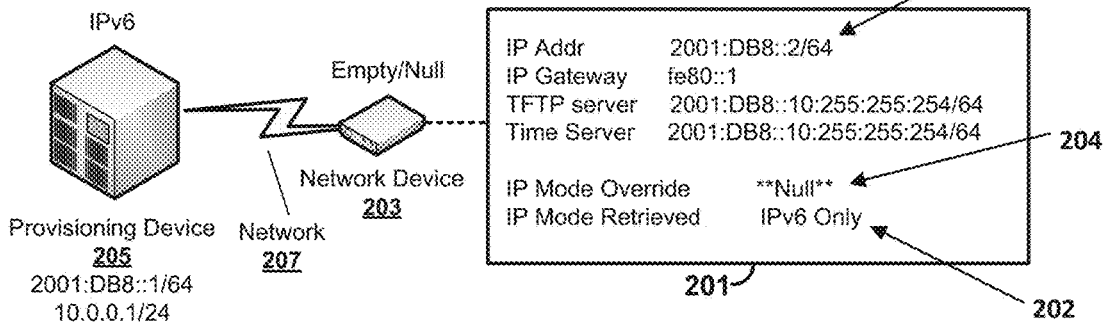
FIG. 2J shows another configuration interface of an exemplary network device.
Figure 2K:
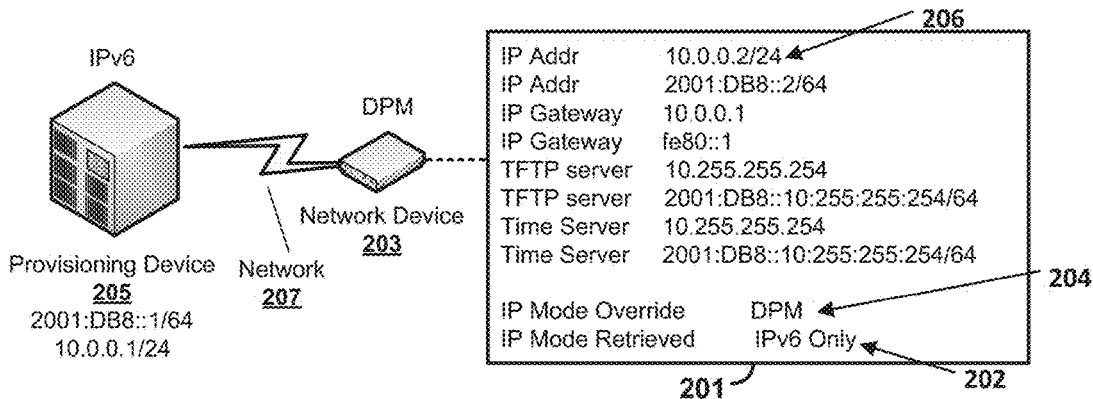
FIG. 2K shows another configuration interface of an exemplary network device.
Figure 2L:
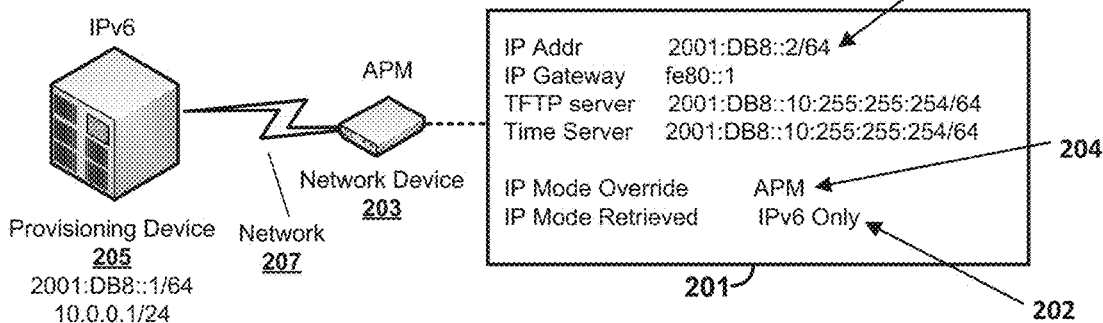
FIG. 2L shows another configuration interface of an exemplary network device.
Figure 2M:
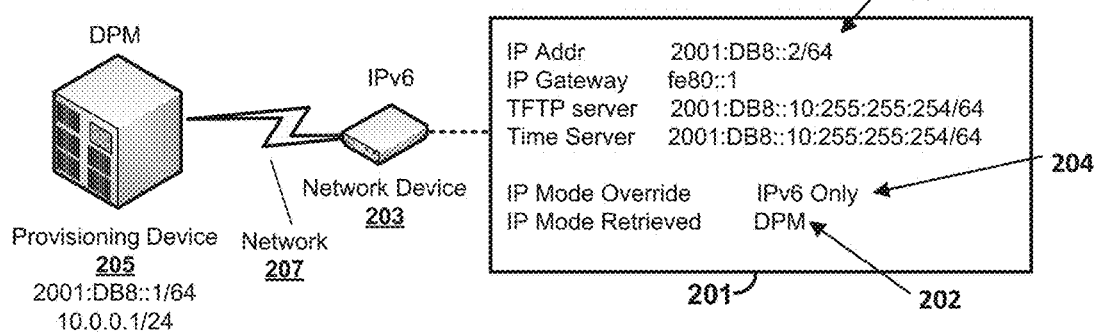
FIG. 2M shows another configuration interface of an exemplary network device.
Figure 2N:
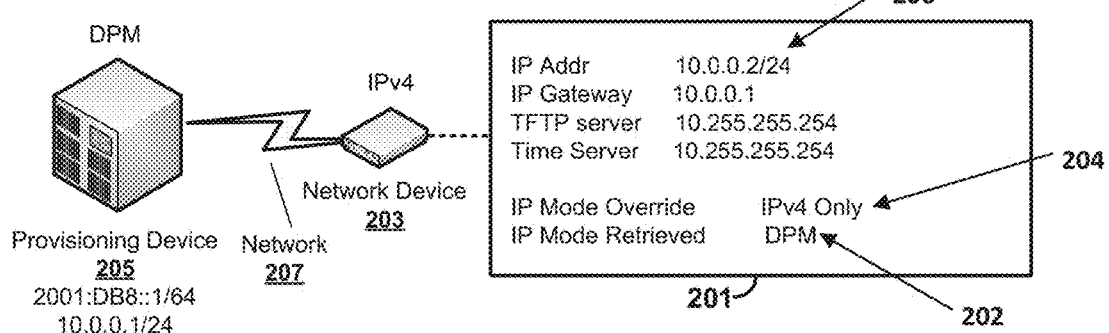
FIG. 2N shows another configuration interface of an exemplary network device.
Figure 2O:
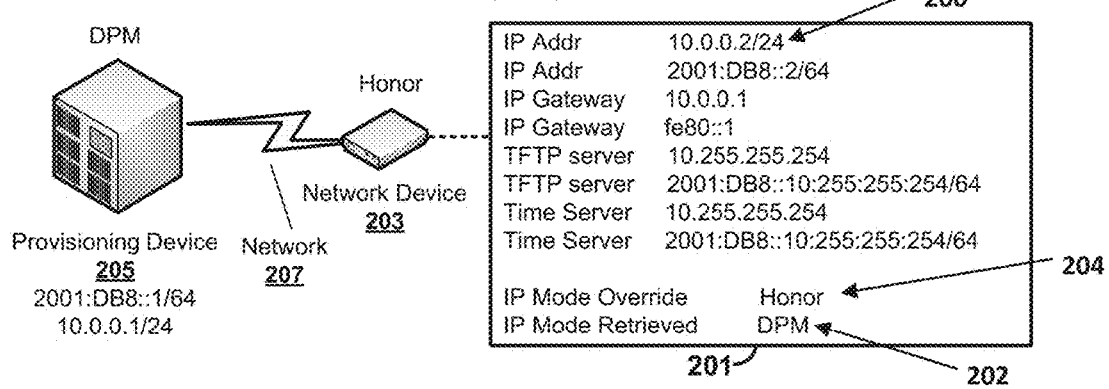
FIG. 2O shows another configuration interface of an exemplary network device.
Figure 2P:
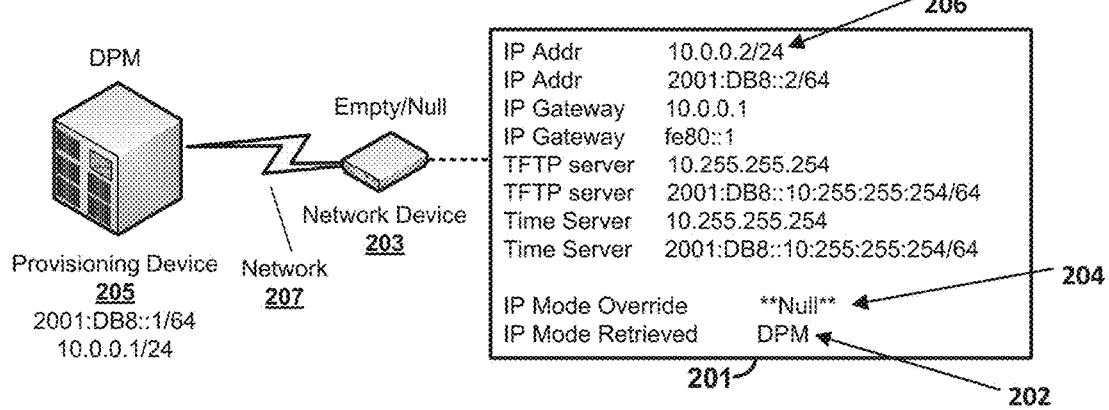
FIG. 2P shows another configuration interface of an exemplary network device.
Figure 2Q:
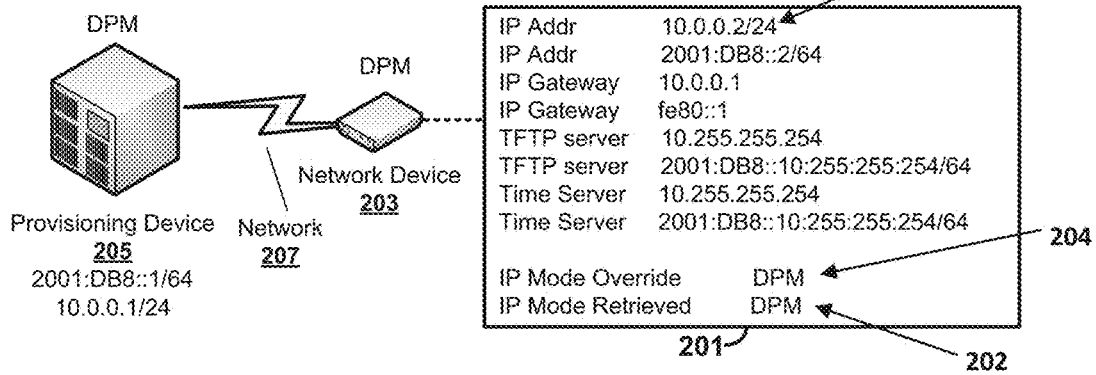
FIG. 2Q shows another configuration interface of an exemplary network device.
Figure 2R:
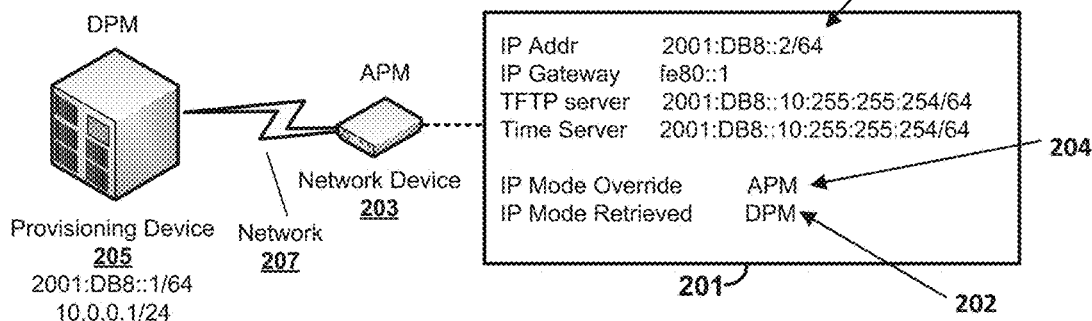
FIG. 2R shows another configuration interface of an exemplary network device.
Figure 2S:
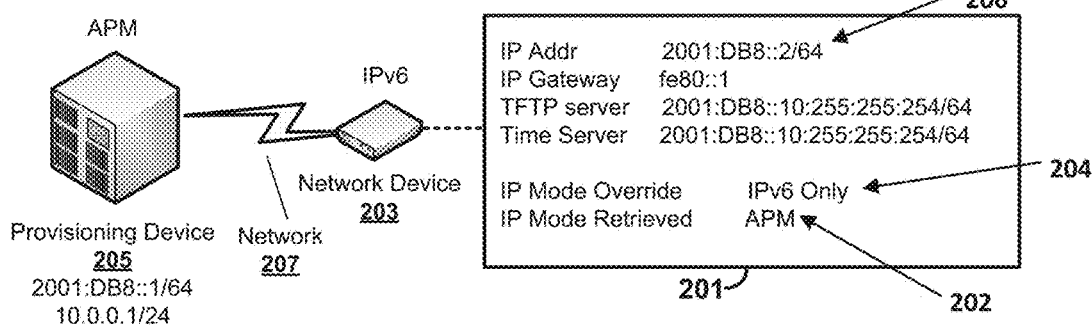
FIG. 2S shows another configuration interface of an exemplary network device.
Figure 2T:
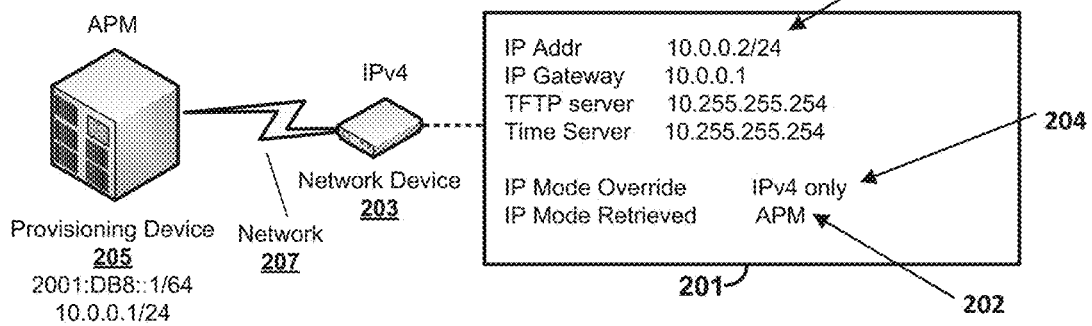
FIG. 2T shows another configuration interface of an exemplary network device.
Figure 2U:
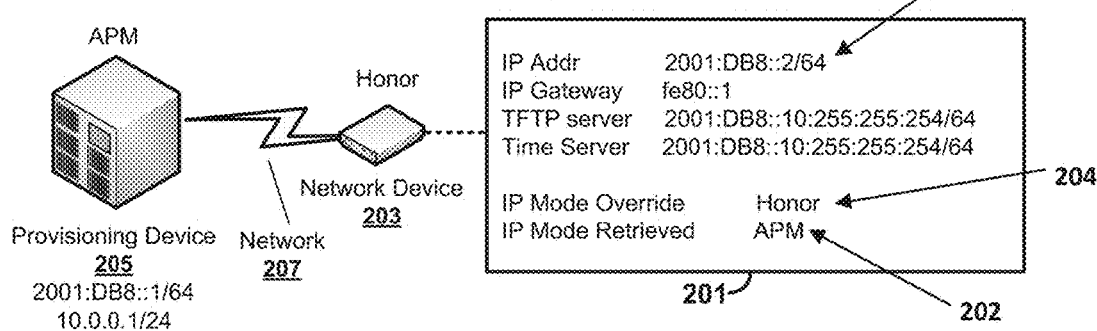
FIG. 2U shows another configuration interface of an exemplary network device.
Figure 2V:
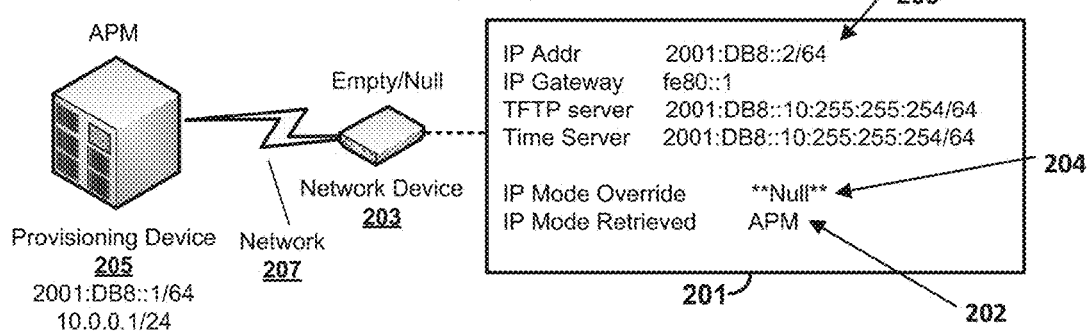
FIG. 2V shows another configuration interface of an exemplary network device.
Figure 2W:
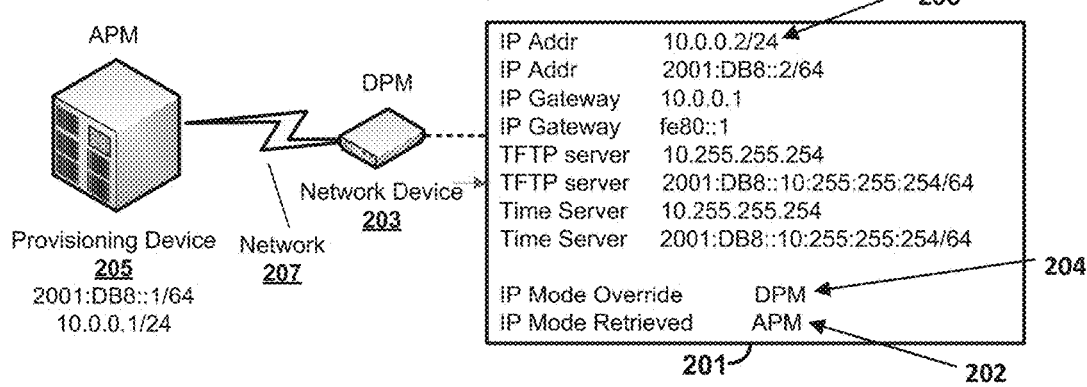
FIG. 2W shows another configuration interface of an exemplary network device.
Figure 2X:
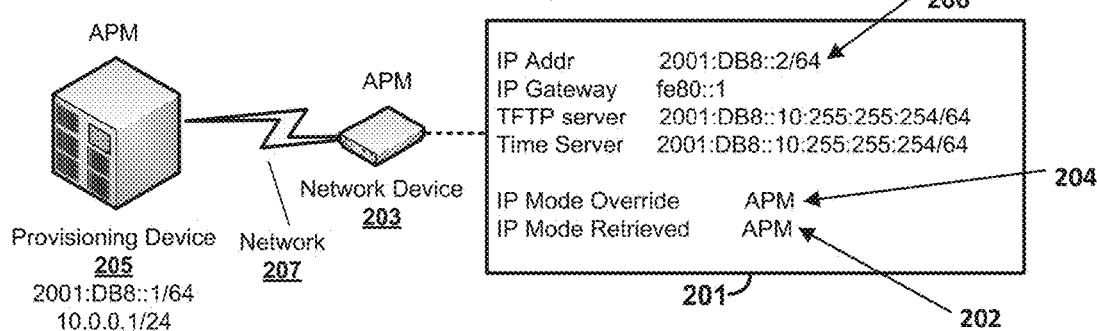
FIG. 2X shows another configuration interface of an exemplary network device.

FIG. 2A through FIG. 2X show configuration interfaces, e.g., screens, of an exemplary network device. FIG. 2A shows a configuration interface 201 of an exemplary network device 203 in which a second message may have been received, as described below. The network device 203 can comprise, for example, a modem, such as a cable modem, digital subscriber line modem, or other kind of modem. The network device 203 can be communicatively coupled to a provisioning device 205 (e.g., a gateway or a termination system) through a network 207 (e.g., cable modem management network). An IP Mode Retrieved value 202 can indicate a mode specified by the first message, and an IP Mode Override value 204 can indicate a mode specified by the second message. In one aspect, the IP Mode Retrieved value 202 can indicate a value of an access layer control message received by the network device 203 as a first message. For example, the IP Mode Retrieved value 202 can comprise a media access control domain descriptor (MDD) IP Mode Retrieved value. In another aspect, the Mode Override value 204 can indicate a value received by the network device 203 as a second message. For example, the IP Mode Override value 204 can comprise a MDD IP Mode Override value. For example, the IP Mode Retrieved value 202 can be shown as IPv4 only provisioning mode, and the IP mode override value 204 can be shown as IPv4 only mode. As specified by the second message in this example, the network device 203 can be connected in IPv4 mode and the IP address value 206 can show an IP address according to IPv4.

FIG. 2B shows a configuration interface 201 of an exemplary network device 203 in which a second message has been received. For example, the IP Mode Retrieved value 202 can be shown as IPv4 only provisioning mode, and the IP mode override value 204 can be shown as Honor mode. As specified by the second message in this example, the network device 203 can be connected in IPv4 mode and the IP address value 206 can show an IP address according to IPv4.

FIG. 2C shows a configuration interface 201 of an exemplary network device 203 in which a second message has not been received by the network device 203. For example, the IP override value 204 can be shown as empty when the network device has not received the second message. The IP Mode Retrieved value 202 can show that the first message has been received by specifying an IPv4 only mode.

FIG. 2D shows a configuration interface 201 of an exemplary network device 203 in which a second message has been received. For example, the IP Mode Retrieved value 202 can be shown as IPv4 only provisioning mode, and the IP mode override value 204 can be shown as Dual-Stack Provisioning Mode (DPM). As specified by the second message in this example, the network device 203 can be connected in Dual-stack mode, and the IP address value 206 can show both IPv4 and IPv6 according to Dual-stack mode.

FIG. 2E shows a configuration interface 201 of an exemplary network device 203 in which a second message has been received. For example, the IP Mode Retrieved value 202 can be shown as IPv4 only provisioning mode, and the IP mode override value 204 can be shown as Alternate Provisioning Mode (APM). As specified by the second message in this example, the network device 203 can be connected in IPv4 mode, and the IP address value 206 can show an IP address according to IPv4. In one aspect, Alternate Provisioning Mode can allow the network device 203 to be instructed on whether IPv4 or IPv6 is the primary mode. The description herein assumes that IPv6 is selected as the primary mode, but aspects of the invention are not limited to such implementations. Accordingly, the device could fail back to IPv4 if IPv6 is not working at the provisioning time.

FIG. 2F shows a configuration interface 201 of an exemplary network device 203 in which a second message has been received. For example, the IP Mode Retrieved value 202 can be shown as IPv4 only provisioning mode, and the IP mode override value 204 can be shown as IPv6 only mode. As specified by the second message in this example, the network device 203 can be connected in IPv6 mode, and the IP address value 206 can show an IP address according to IPv6.

FIG. 2G shows a configuration interface 201 of an exemplary network device 203 in which a second message has been received. For example, the IP Mode Retrieved value 202 can be shown as IPv6 only provisioning mode, and the IP mode override value 204 can be shown as IPv6 only mode. As specified by the second message in this example, the network device 203 can be connected in IPv6 mode, and the IP address value 206 can show an IP address according to IPv6.

FIG. 2H shows a configuration interface 201 of an exemplary network device 203 in which a second message has been received. For example, the IP Mode Retrieved value 202 can be shown as IPv6 only provisioning mode, and the IP mode override value 204 can be shown as IPv4 only mode. As specified by the second message in this example, the network device 203 can be connected in IPv4 mode, and the IP address value 206 can show an IP address according to IPv4.

FIG. 2I shows a configuration interface 201 of an exemplary network device 203 in which a second message has been received. For example, the IP Mode Retrieved value 202 can be shown as IPv6 only provisioning mode, and the IP mode override value 204 can be shown as Honor mode. As specified by the second message in this example, the network device 203 can be connected in IPv6 mode, and the IP address value 206 can show an IP address according to IPv6.

FIG. 2J shows a configuration interface 201 of an exemplary network device 203 in which a second message has been received. For example, the IP Mode Retrieved value 202 can be shown as IPv6 only provisioning mode, and the IP mode override value 204 can be shown as empty or null. As specified by the second message in this example, the network device 203 can be connected in IPv6 mode, and the IP address value 206 can show an IP address according to IPv6.

FIG. 2K shows a configuration interface 201 of an exemplary network device 203 in which a second message has been received. For example, the IP Mode Retrieved value 202 can be shown as IPv6 only provisioning mode, and the IP mode override value 204 can be shown as DPM. As specified by the second message in this example, the network device 203 can be connected in Dual-stack mode, and the IP address value 206 can show both IPv4 and IPv6 according to Dual-Stack mode.

FIG. 2L shows a configuration interface 201 of an exemplary network device 203 in which a second message has been received. For example, the IP Mode Retrieved value 202 can be shown as IPv6 only provisioning mode, and the IP mode override value 204 can be shown as APM. As specified by the second message in this example, the network device 203 can be connected in IPv6 mode, and the IP address value 206 can show an IP address according to IPv6.

FIG. 2M shows a configuration interface 201 of an exemplary network device 203 in which a second message has been received. For example, the IP Mode Retrieved value 202 can be shown as DPM mode, and the IP mode override value 204 can be shown as IPv6 only mode. As specified by the second message in this example, the network device 203 can be connected in IPv6 mode, and the IP address value 206 can show an IP address according to IPv6.

FIG. 2N shows a configuration interface 201 of an exemplary network device 203 in which a second message has been received. For example, the IP Mode Retrieved value 202 can be shown as DPM mode, and the IP mode override value 204 can be shown as IPv4 only mode. As specified by the second message in this example, the network device 203 can be connected in IPv4 mode, and the IP address value 206 can show an IP address according to IPv4.

FIG. 2O shows a configuration interface 201 of an exemplary network device 203 in which a second message has been received. For example, the IP Mode Retrieved value 202 can be shown as DPM mode, and the IP mode override value 204 can be shown as Honor. As specified by the second message in this example, the network device 203 can be connected in Dual-stack mode, and the IP address value 206 can show both IPv4 and IPv6 according to Dual-Stack mode.

FIG. 2P shows a configuration interface 201 of an exemplary network device 203 in which a second message has been received. For example, the IP Mode Retrieved value 202 can be shown as DPM mode, and the IP mode override value 204 can be shown as empty or null. As specified by the second message in this example, the network device 203 can be connected in Dual-stack mode, and the IP address value 206 can show both IPv4 and IPv6 according to Dual-Stack mode.

FIG. 2Q shows a configuration interface 201 of an exemplary network device 203 in which a second message has been received. For example, the IP Mode Retrieved value 202 can be shown as DPM mode, and the IP mode override value 204 can be shown as DPM. As specified by the second message in this example, the network device 203 can be connected in Dual-stack mode, and the IP address value 206 can show both IPv4 and IPv6 according to Dual-Stack mode.

FIG. 2R shows a configuration interface 201 of an exemplary network device 203 in which a second message has been received. For example, the IP Mode Retrieved value 202 can be shown as DPM mode, and the IP mode override value 204 can be shown as APM. As specified by the second message in this example, the network device 203 can be connected in IPv6 mode, and the IP address value 206 can show an IP address according to IPv6.

FIG. 2S shows a configuration interface 201 of an exemplary network device 203 in which a second message has been received. For example, the IP Mode Retrieved value 202 can be shown as APM mode, and the IP mode override value 204 can be shown as IPv6 only mode. As specified by the second message in this example, the network device 203 can be connected in IPv6 mode, and the IP address value 206 can show an IP address according to IPv6.

FIG. 2T shows a configuration interface 201 of an exemplary network device 203 in which a second message has been received. For example, the IP Mode Retrieved value 202 can be shown as APM mode, and the IP mode override value 204 can be shown as IPv4 only mode. As specified by the second message in this example, the network device 203 can be connected in IPv4 mde, and IP address value 206 can show an IP address according to IPv4.

FIG. 2U shows a configuration interface 201 of an exemplary network device 203 in which a second message has been received. For example, the IP Mode Retrieved value 202 can be shown as APM mode, and the IP mode override value 204 can be shown as Honor. As specified by the second message in this example, the network device 203 can be connected in IPv6 mode, and the IP address value 206 can show an IP address according to IPv6.

FIG. 2V shows a configuration interface 201 of an exemplary network device 203 in which a second message has been received. For example, the IP Mode Retrieved value 202 can be shown as APM mode, and the IP mode override value 204 can be shown as empty or null. As specified by the second message in this example, the network device 203 can be connected in IPv6 mode, and the IP address value 206 can show an IP address according to IPv6.

FIG. 2W shows a configuration interface 201 of an exemplary network device 203 in which a second message has been received. For example, the IP Mode Retrieved value 202 can be shown as APM mode, and the IP mode override value 204 can be shown as DPM. As specified by the second message in this example, the network device 203 can be connected in Dual-stack mode, and the IP address value 206 can show both IPv4 and IPv6 according to Dual-Stack mode.

FIG. 2X shows a configuration interface 201 of an exemplary network device 203 in which a second message has been received. For example, the IP Mode Retrieved value 202 can be shown as APM mode, and the IP mode override value 204 can be shown as APM. As specified by the second message in this example, the network device 203 can be connected in IPv6 mode, and the IP address value 206 can show an IP address according to IPv6.

Figure 3:
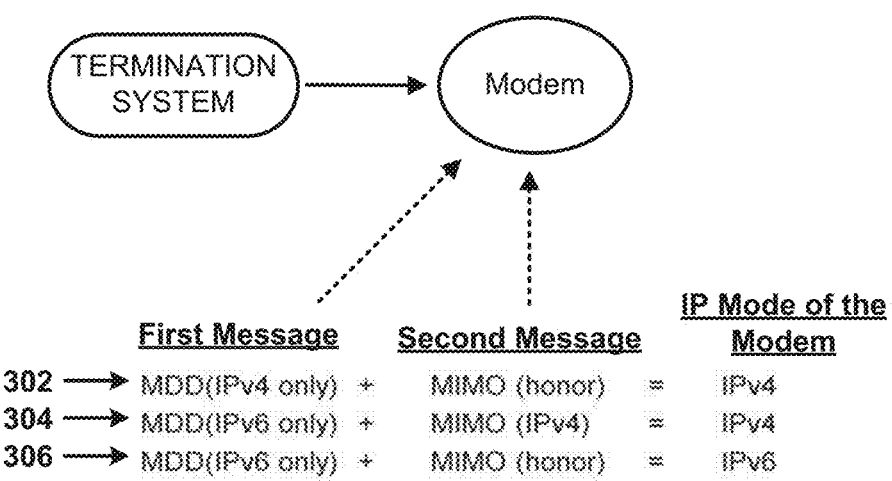
FIG. 3 is a diagram illustrating an example relationship between a first message and a second message for an exemplary network device.

FIG. 3 is a diagram illustrating an example relationship between a first message and a second message for an exemplary network device. While the following description references configurations that, in some cases, may be specific to modems, it should be understood these examples are merely illustrations and that aspects of the disclosure are applicable to different types of modems (e.g., cable modems), fiber optic interface nodes, twisted pair modems, and the like. The diagram illustrates three example scenarios. In the first scenario 302, a termination system, or another network node, can transmit a first message to a network device in a MAC domain descriptor (MDD) to use IPv4 only. For example, the MDD can comprise an access layer control message. Then, the termination system can transmit a second message as a MAC IP Mode Override (MIMO) value specifying an honor mode (e.g., to use the mode specified in the first message). For example, the MIMO can be communicated in a boot file, simple network management protocol set request message, hypertext transfer protocol message, or the like. The result can be that the network device is configured to connect to a network by IPv4.

In the second scenario 304, a termination system can transmit a first message in a MAC domain descriptor (MDD) specifying to use IPv6 only. Next, the termination system can transmit a second message as a MIMO value specifying IPv4. The MIMO value can instruct the network device to use the protocol specified in the MIMO rather than a protocol specified by the first message. The result can be that the network device is configured to connect to a network by IPv4. In the third scenario 306, a termination system can transmit a first message in a MAC domain descriptor (MDD) specifying to use IPv6 only. Next, the termination system can transmit a second message in a MIMO value specifying an honor mode (e.g., to use the mode specified in the first message). Thus, the network device can be configured to connect to a network by IPv6.

Figure 4:
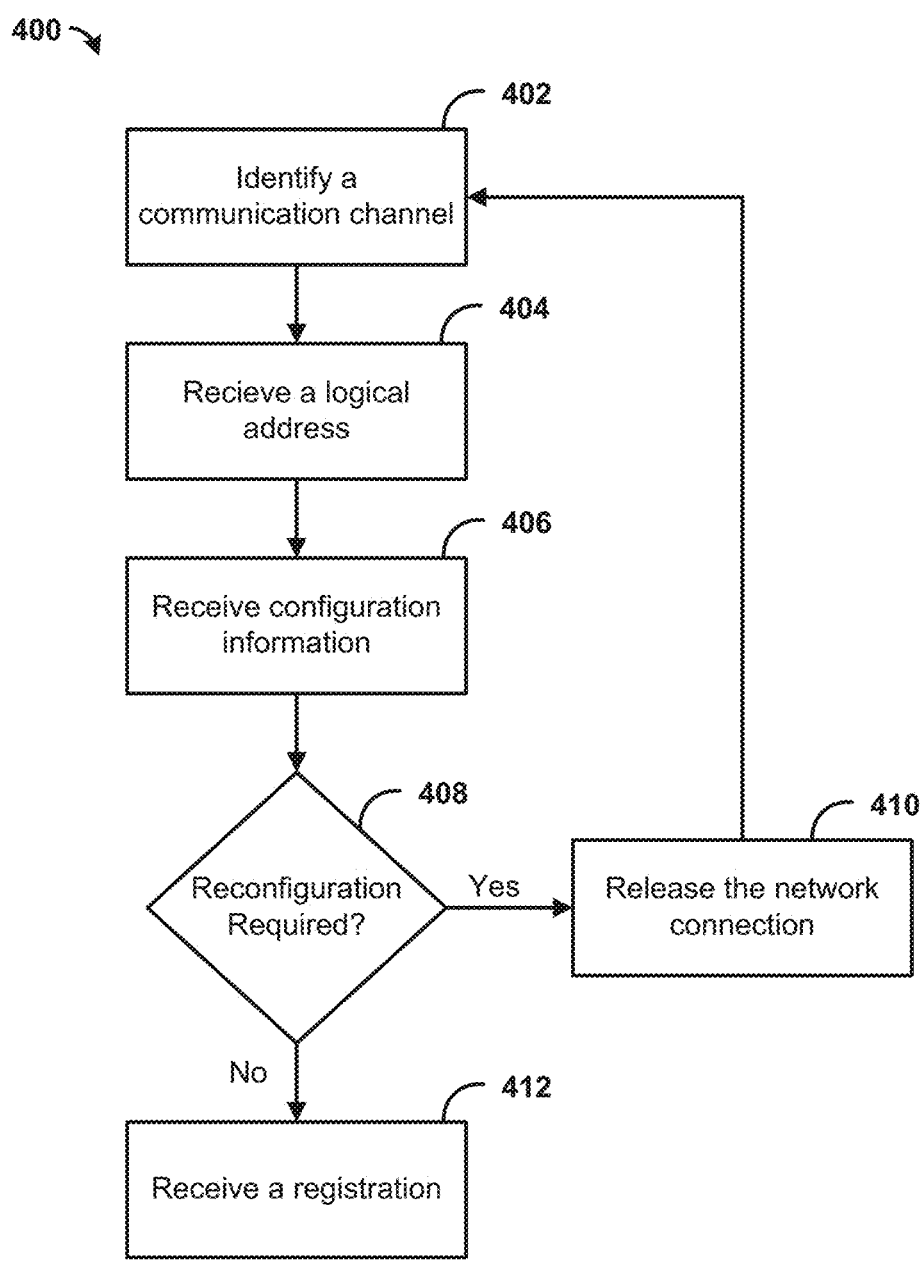
FIG. 4 is a flowchart illustrating an exemplary method for initializing a network device.

FIG. 4 is a flowchart illustrating an exemplary method 400 for initializing a network device. In one aspect, the network device can connect to the termination system by an initialization process. In step 402, a communication channel can be identified. For example, the network device can perform ranging to identify available physical communication channels on a fiber-optic, coaxial, and/or other physical communication line. Additionally, a first message can be received by the network device specifying a protocol to use for a network connection In step 404, a logical address can be received. In an aspect, the network device can communicate with a logical address server. The logical address server can comprise, for example, a dynamic host configuration protocol (DHCP) server. The logical address server can assign the network device a logical address, such as an IP address. In another aspect, the logical address can be configured according to the first message. In another aspect, the logical address can be configured according to the second message or other subsequent message. For example, if the network device has reached step 404, after performing step 406, 408, and 410, then the logical address server can configure the logical address according to the second message.

In step 406, configuration information can be received. In an aspect, the configuration information can comprise the second message. The configuration information can be received in a boot file. For example, the boot file can be communicated through a Trivial File Transfer Protocol (TFTP) transmission. In another aspect, the configuration information can be received through a Simple Network Management Protocol (SNMP) transmission. In another aspect, the configuration information can be received through a Hypertext Transfer Protocol (HTTP) message.

In step 408, a decision to reconfigure the network device can be made based on the configuration information. For example, if the second message specifies a protocol different than a protocol specified by the first message, then the method 400 can proceed to step 410, If the second message does not specify a protocol different than the protocol specified in the first message, then the method 400 can proceed to step 412.

In step 410, the network device can release the network connection that is connected through the protocol specified by the first message. Additionally, in one aspect, the network device can proceed to step 402 to begin the initialization process again. In step 412, the network device can receive a registration. Following registration, the network device can be ready to transmit and receive according to specifications of the network. Though not shown, the network device can perform other configuration steps, such as requesting and receiving a time of day from a time of day server and other additional steps prior to step 412.

Figure 5:
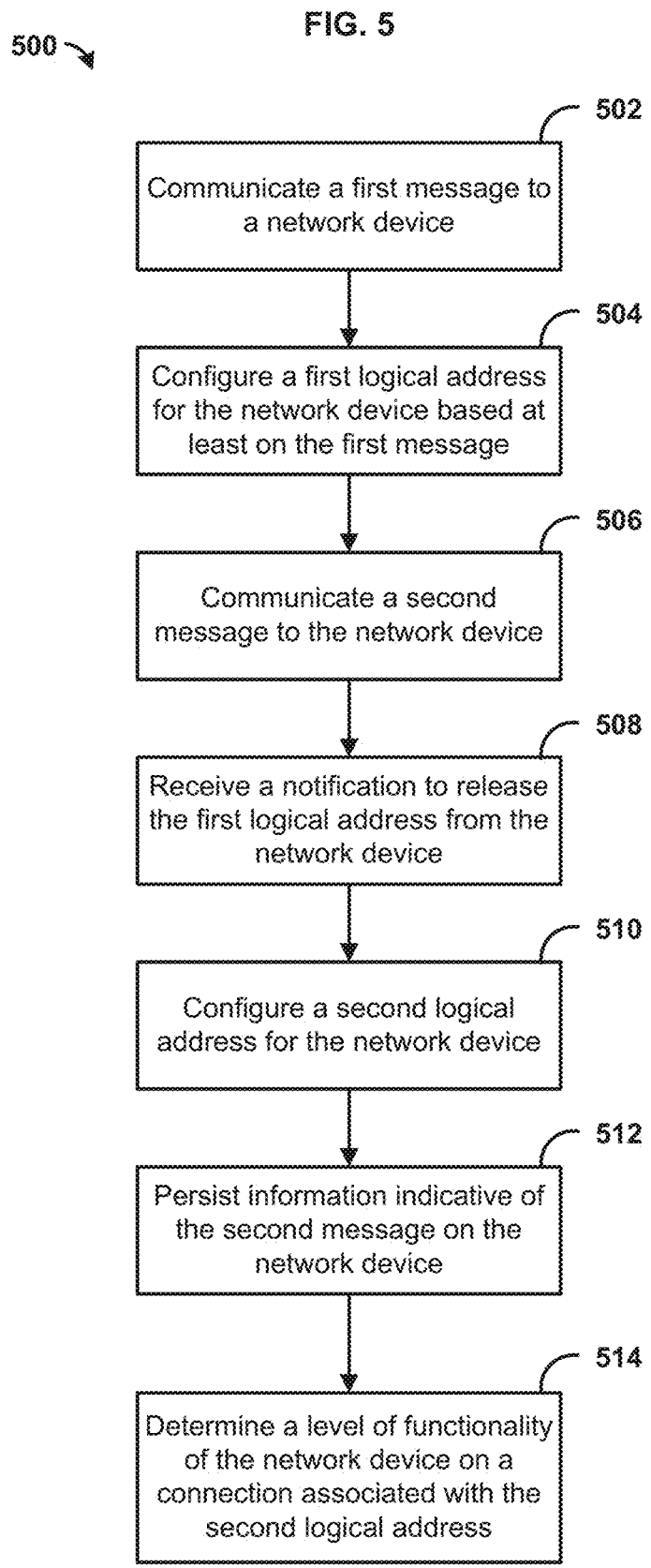
FIG. 5 is a flowchart illustrating an exemplary method for network configuration.

FIG. 5 is a flowchart illustrating an exemplary method 500 for network configuration. In step 502, a first message (e.g., directive, communication) can be communicated to a network device. For example, in step 502 an access layer control message can be communicated. In one aspect, the access layer control message can comprise a medium access control domain descriptor message. The first message can specify one of a first protocol or a second protocol. In one aspect, the first protocol can be Internet Protocol version 4 (IPv4) and the second protocol can be Internet Protocol version 6 (IPv6). In another aspect, the first protocol can be IPv6, and the second protocol can be an IPv4. In step 504, a first logical address for the network device can be configured based at least on the first message.

In step 506, a second message (e.g., directive, communication) can be communicated to the network device. For example, in step 506, at least one of a boot file, a simple network management protocol set request, or a hypertext transfer protocol can be transmitted. In step 506, configuration information can be communicated to the network device. For example, step 506 can comprise communicating a protocol configuration mode override message. In one aspect, the protocol configuration mode override message can comprise a medium access control domain descriptor Internet Protocol provisioning mode override message. In another example, step 506 can comprise communicating an IP provisioning mode attribute within a medium access control domain descriptor message. In one aspect, the second message can specify one of a first mode directing the network device to use the first protocol to connect to a network or a second mode directing the network device to use the second protocol to connect to the network. In another aspect, the second message can specify one of the first mode, the second mode, or a third mode directing the network device to use one of the first protocol or the second protocol specified by the first message to connect to the network. Additionally, the second message can communicate an instruction to dismiss the first message.

In step 508, a notification can be received to release the first logical address from the network device. In step 510, a second logical address can be configured for the network device. The second logical address can be defined according to the second message. In step 512, information indicative of the second message can be persisted on the network device in response to at least one of resetting the network device, powering off the network device, or performing a factory reset to restore the network device to a default configuration. In step 514, a level of functionality of the network device on a connection associated with the second logical address can be determined.

Figure 6:
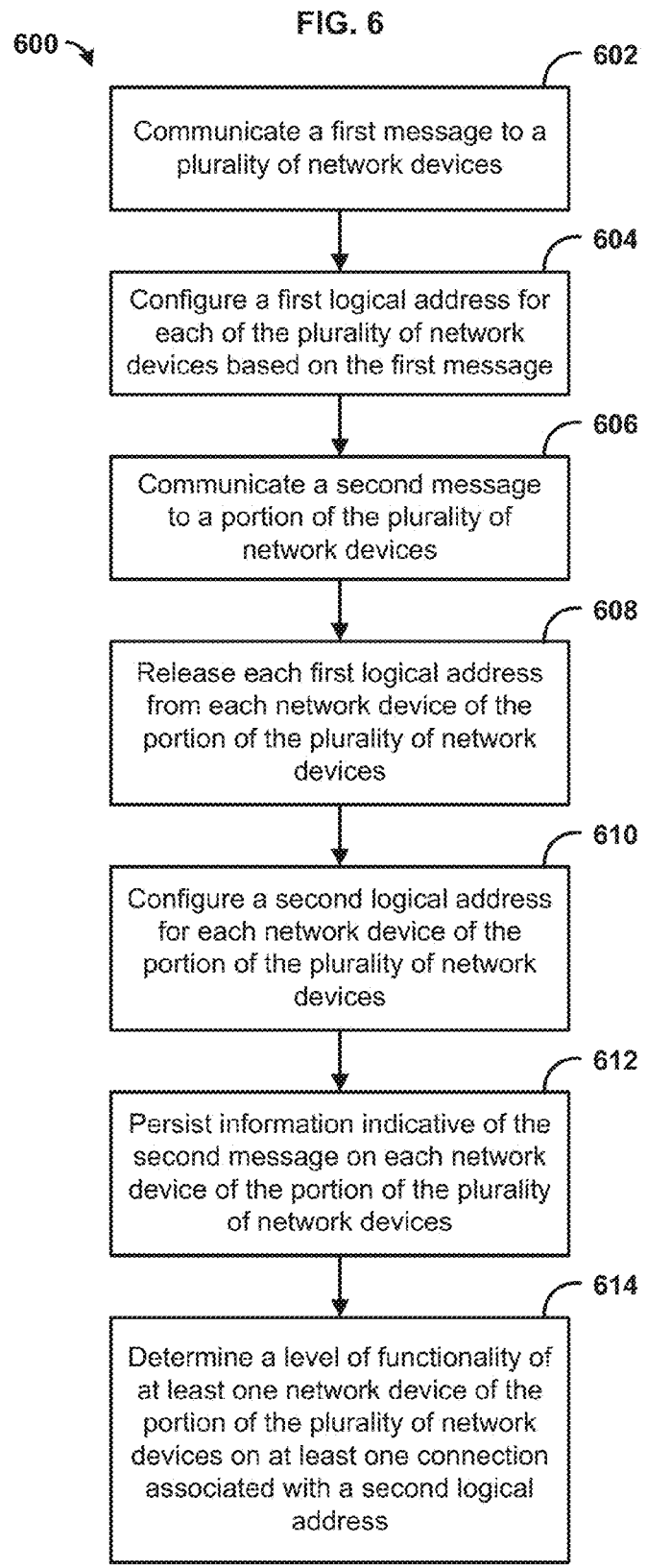
FIG. 6 is a flowchart illustrating another exemplary method for network configuration.

FIG. 6 is a flowchart illustrating another exemplary method for network configuration. In step 602, a first message e.g., directive, communication) can be communicated to a plurality of network devices. The first message can specify one of a first protocol or a second protocol. For example, in step 602 an access layer control message can be communicated. In one aspect, the access layer control message can comprise a medium access control domain descriptor message. In one aspect, the first protocol is Internet Protocol version 4 (IPv4) and the second protocol is IP version 6 (IPv6). In another aspect, the first protocol is IPv6 and the second protocol is an IPv4. In step 604, a first logical address can be configured for each of the plurality of network devices based on the first message.

In step 608, a second message (e.g., directive, communication) can be communicated to at least a portion of the plurality of network devices. In one aspect, in step 608 configuration information can be communicated to each network device of the portion of the plurality of network devices. For example, communicating configuration information to each network device of the portion of the plurality of network devices can comprise one of transmitting at least on of a boot file, a simple network management protocol set request, and a hypertext transfer protocol message. Additionally, the second message can communicate an instruction to dismiss the first message. In one aspect, step 608 can comprise communicating a protocol configuration mode override message. For example, the protocol configuration mode override message can comprise a medium access control domain descriptor Internet Protocol mode override message.

In another aspect, in step 608 an IP provisioning mode attribute within a medium access control Domain Descriptor message can be communicated. The second message can specify one of a first mode directing each network device of the portion of the plurality of network devices to use the first protocol to connect to a network or a second mode directing each network device of the portion of the plurality of network devices to use the second protocol to connect to the network. In another aspect, the second message can specify one of the first mode, the second mode, or a third mode directing each network device of the portion of the plurality of network devices to use the one of the first protocol or the second protocol specified by the first message to connect to the network.

In step 610, each first logical address can be released from each network device of the portion of the plurality of network devices. In step 612, a second logical address can be configured for each network device of the portion of the plurality of network devices, each second logical address defined according to the second message. In step 614, information indicative of the second message can be persisted on each network device of the portion of the plurality of network devices during at least one of resetting of each network device, powering off each network device, or performing a factory reset to restore each network device to a default configuration. In step 616, a level of functionality of at least one network device of the portion of the plurality of network devices can be determined on at least one connection associated with a second logical address.

Figure 7:
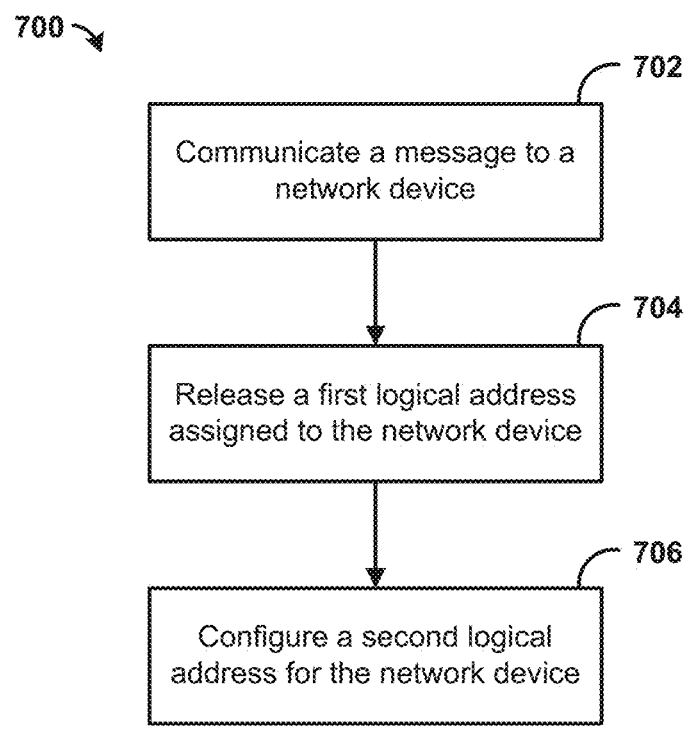
FIG. 7 is a flowchart illustrating yet another exemplary method for network configuration.

FIG. 7 is a flowchart illustrating yet another exemplary method for network configuration. In step 702, a message (e.g., directive, communication) can be communicated to a network device. In one aspect, the message can specify one of a first mode directing the network device to use a first protocol to connect to a network or a second mode directing the network device to use a second protocol to connect to the network. For example, the first protocol can be one of an IPv4 and an IPv6, and the second protocol can be the other of IPv4 and IPv6. In one aspect, in step 702 a protocol configuration mode override message can be communicated. For example, the protocol configuration mode override message can comprise a medium access control domain descriptor internet protocol provisioning mode override message. In another aspect, in step 702 at least one of a boot file, a simple network management protocol set request, and a hypertext transfer protocol message can be transmitted.

In step 704, a first logical address assigned to the network device can be released. In step 706, a second logical address can be configured for the network device. The second logical address can be defined according to the message.

Figure 8:
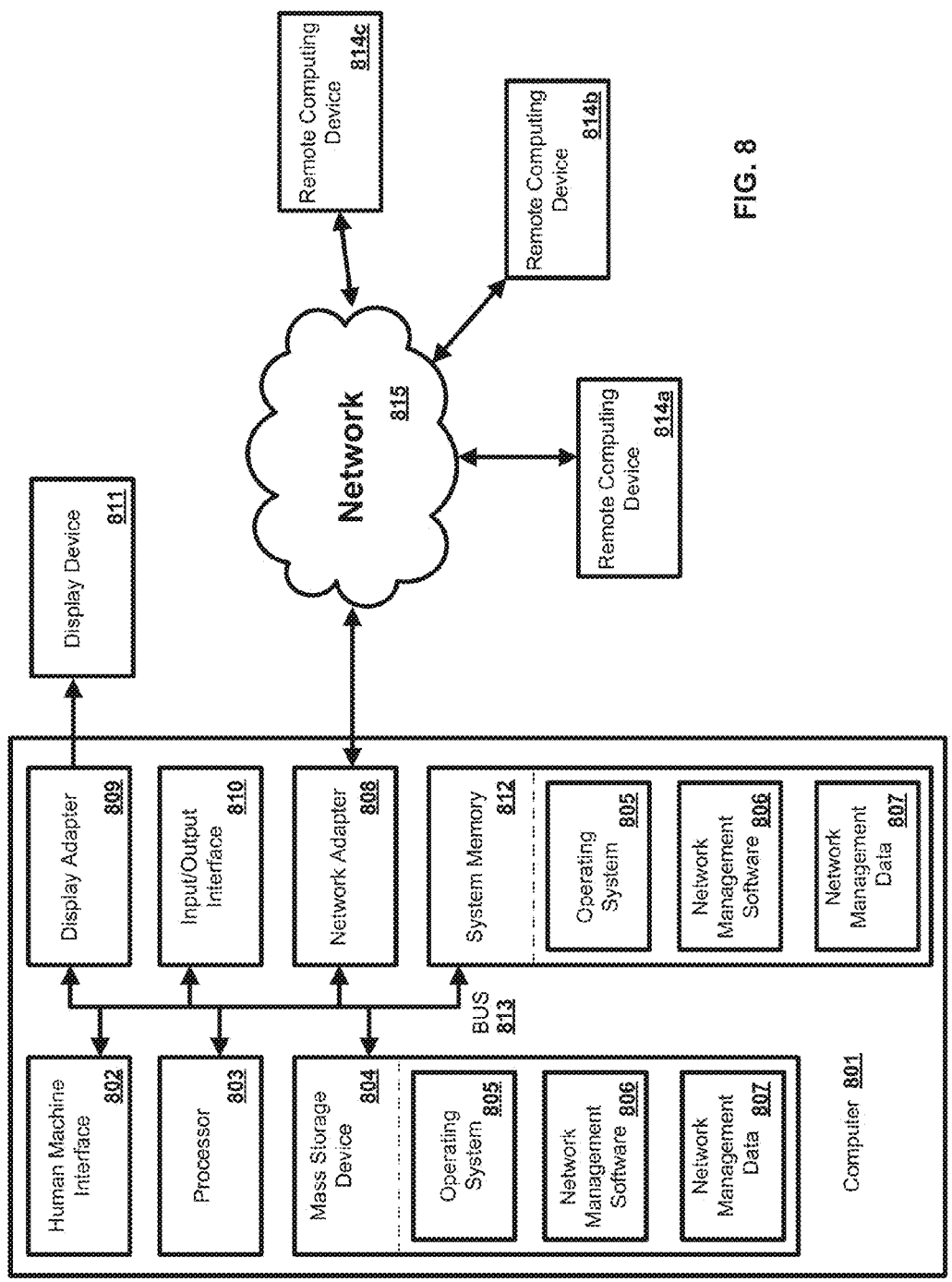
FIG. 8 is a block diagram illustrating an exemplary computing system in which the systems and methods can operate.

In an exemplary aspect, the methods and systems can be implemented on a computer 801 as illustrated in FIG. 8 and described below. By way of example, system 102 of FIG. 1 can comprise a computer as illustrated in FIG. 8. Similarly, the methods and systems disclosed can utilize one or more computers to perform one or more functions in one or more locations. FIG. 8 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 801. The components of the computer 801 can comprise, but are not limited to, one or more processors or processing units 803, a system memory 812, and a system bus 813 that couples various system components including the processor 803 to the system memory 812. In the case of multiple processing units 803, the system can utilize parallel computing.

The system bus 813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card industry Association (PCMCIA), Universal Serial Bus (USB) and the like. The bus 813, and all buses specified in this description can also be implemented over a wired or wireless network connection and each of the subsystems, including the processor 803, a mass storage device 804, an operating system 805, network management software 806, network management data 807, a network adapter 808, system memory 812, an Input/Output Interface 810, a display adapter 809, a display device 811, and a human machine interface 802, can be contained within one or more remote computing devices 814a,b,c at physically separate locations, connected through buses of this form, in effect implementing a fully distributed system.

The computer 801 typically comprises a variety of computer readable media. Exemplary readable media can be any available media that is accessible by the computer 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as network management data 807 and/or program modules such as operating system 805 and network management software 806 that are immediately accessible to and/or are presently operated on by the processing unit 803.

In another aspect, the computer 801 can also comprise other removable/non-removable, volatile/non-volatile computer storage media. By way of example, FIG. 8 illustrates a mass storage device 804 which can provide non-volatile storage of computer code, computer readable instructions, data structures, program modules, and other data for the computer 801. For example and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, an operating system 805 and network management software 806. Each of the operating system 805 and network management software 806 (or some combination thereof) can comprise elements of the programming and the network management software 806. Network management data 807 can also be stored on the mass storage device 804. Network management data 807 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 803 via a human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, a display device 811 can also be connected to the system bus 813 via an interface, such as a display adapter 809, It is contemplated that the computer 801 can have more than one display adapter 809 and the computer 801 can have more than one display device 811. For example, a display device can be a monitor, an LCD (Liquid Crystal Display), or a projector. In addition to the display device 811, other output peripheral devices can comprise components such as speakers (not shown) and a printer (not shown) which can be connected to the computer 801 via Input/Output interface 810. Any step and/or result of the methods can be output in any form to an output device. Such output can be any form of visual representation, including, but not limited to, textual, graphical, animation, audio, tactile, and the like. The display 811 and computer 801 can be part of one device, or separate devices.

The computer 801 can operate in a networked environment using logical connections to one or more remote computing devices 814a,b,c. By way of example, a remote computing device can be a personal computer, portable computer, smartphone, a server, a router, a network computer, a peer device or other common network node, and so on. Logical connections between the computer 801 and a remote computing device 814a,b,c can be made via a network 815, such as a local area network (LAN) and/or a general wide area network (WAN). Such network connections can be through a network adapter 808. A network adapter 808 can be implemented in both wired and wireless environments. Such networking environments are conventional and commonplace in dwellings, offices, enterprise-wide computer networks, intranets, and the Internet.

For purposes of illustration, application programs and other executable program components such as the operating system 805 are illustrated herein as discrete blocks, although it is recognized that such programs and components reside at various times in different storage components of the computing device 801, and are executed by the data processor(s) of the computer. An implementation of network management software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
    transmitting, to a network device, a first message comprising an access layer control message, the first message specifying one of a first protocol or a second protocol;
    determining a first logical address for the network device based at least on the first message;
    transmitting, to the network device, a second message, wherein the second message specifies one of a first mode, directing the network device to use the first protocol to connect to a network, or a second mode, directing the network device to use the second protocol to connect to the network;
    receiving, from the network device, a notification to release the first logical address; and
    determining a second logical address for the network device, the second logical address being defined according to the second message.

2. The method of claim 1, wherein the first protocol comprises Internet Protocol version 4 and the second protocol comprises Internet Protocol version 6.

3. The method of claim 1, wherein the first protocol comprises Internet Protocol version 6 and the second protocol comprises Internet Protocol version 4.

4. The method of claim 1, wherein the second message specifies one of the first mode, the second mode, or a third mode directing the network device to use, to connect to the network, one of the first protocol or the second protocol specified by the first message.

5. The method of claim 1, wherein transmitting, to the network device, the second message comprises transmitting a protocol configuration override message.

6. The method of claim 1, wherein transmitting, to the network device, the second message comprises transmitting a medium access control domain descriptor Internet Protocol override message.

7. The method of claim 1, wherein transmitting, to the network device, the second message comprises transmitting information to configure the network device.

8. The method of claim 7, wherein transmitting information to configure the network device comprises transmitting at least one of a boot file, a simple network management protocol set request, or a hypertext transfer protocol message.

9. The method of claim 1, further comprising persisting information indicative of the second message on the network device in response to at least one of resetting the network device, powering off the network device, or performing a factory reset to restore the network device to a default configuration.

10. The method of claim 1, further comprising determining a level of functionality of the network device on a connection associated with the second logical address.

11. A method, comprising:
    transmitting, to a network device, a first message specifying one of a first protocol or a second protocol;
    determining a first logical address for the network device based at least on the first message;
    transmitting, to the network device, a second message comprising a medium access control domain descriptor Internet Protocol override message, wherein the second message specifies one of a first mode, directing the network device to use the first protocol to connect to a network, or a second mode, directing the network device to use the second protocol to connect to the network;
    receiving, from the network device, a notification to release the first logical address; and
    determining a second logical address for the network device, the second logical address being defined according to the second message.

12. The method of claim 11, wherein the first protocol is Internet Protocol version 4 and the second protocol is Internet Protocol version 6.

13. The method of claim 11, wherein the first protocol is Internet Protocol version 6 and the second protocol is Internet Protocol version 4.

14. The method of claim 11, wherein the second message specifies one of the first mode, the second mode, or a third mode directing the network device to use one of the first protocol or the second protocol specified by the first message to connect to the network.

15. The method of claim 11, wherein transmitting, to the network device, the first message comprises transmitting an access layer control message.

16. The method of claim 11, wherein the second message comprises an instruction to dismiss the first message.

17. The method of claim 11, wherein transmitting, to the network device, the second message comprising the medium access control domain descriptor Internet Protocol override message comprises transmitting configuration information to the network device.

18. The method of claim 17, wherein transmitting configuration information to the network device comprises transmitting at least one of a boot file, a simple network management protocol set request, and a hypertext transfer protocol message.

19. The method of claim 11, further comprising determining a level of functionality of the network device on a connection associated with the second logical address.

20. An apparatus comprising:
    one or more processors; and
    a memory storing processor executable instructions that, when executed by the one or more processors, cause the apparatus to:
        transmit, to a network device, a first message specifying one of a first protocol or a second protocol;

determine a first logical address for the network device based at least on the first message;

transmit, to the network device, a second message comprising an instruction to dismiss the first message, wherein the second message specifies one of a first mode, directing the network device to use the first protocol to connect to a network, or a second mode, directing the network device to use the second protocol to connect to the network;

receive, from the network device, a notification to release the first logical address; and determine a second logical address for the network device, the second logical address being defined according to the second message.

* * * * *